United States Patent
Read

[15] 3,658,354
[45] Apr. 25, 1972

[54] METHOD AND APPARATUS FOR CONVERTING A TRICYCLE TO A BICYCLE

[72] Inventor: George W. Read, 5005 Kalanianaole Highway, Honolulu, Hawaii 96821

[22] Filed: Feb. 16, 1970

[21] Appl. No.: 11,417

[52] U.S. Cl. ..........................280/7.15, 280/278, 280/287
[51] Int. Cl. ..........................................................B62k 13/04
[58] Field of Search ..................280/7.15, 7.1, 7.14, 7.17, 280/287, 278, 282

[56] References Cited

UNITED STATES PATENTS

| | | | |
|---|---|---|---|
| 2,458,127 | 1/1949 | Ahrens | 280/7.1 |
| 2,209,058 | 7/1940 | Johnson | 280/7.15 |
| 1,778,116 | 10/1930 | Marqua | 280/282 |
| 1,434,701 | 11/1922 | Hudry | 280/7.15 |
| 1,854,337 | 4/1932 | Kraeft | 280/282 |
| 2,836,427 | 5/1958 | Anderson | 280/7.1 |
| 2,189,232 | 2/1940 | Snell | 280/282 X |

*Primary Examiner*—Benjamin Hersh
*Assistant Examiner*—Milton L. Smith

*Attorney*—Clarence A. O'Brien and Harvey B. Jacobson

[57] ABSTRACT

An attachment for the lower rear end of the forwardly and downwardly opening arcuate main frame portion of a tricycle to comprise a replacement for the rigid rear transverse axle assembly of a tricycle. The attachment includes a fork member similar to the front fork of a tricycle and includes a pair of generally parallel arms interconnected at one pair of corresponding ends by means of a transverse bight portion extending therebetween. The bight portion of the fork member includes a sleeve portion projecting from the side thereof remote from the other pair of ends of the arms of the fork between which a single rear wheel is journaled and the sleeve or sleeve portion projecting from the bight portion is telescopingly engageable with and rigidly securable to the rear lower portion of the main frame of the tricycle after the conventional solid transverse axle assembly of the tricycle has been removed. In this manner, the tricycle is converted into a low bicycle including driving pedals on its front steerable wheel. It is also envisioned that the attachment may have the fork member portion thereof constructed of two identical pieces with one half of the sleeve or sleeve portion of the fork member being defined on each piece whereby the halves of the sleeve member may be "through bolted" to the rear end of the main frame portion of the tricycle to be converted.

1 Claims, 5 Drawing Figures

PATENTED APR 25 1972

3,658,354

George W. Read
INVENTOR

BY Clarence A. O'Brien
and Harvey B. Jacobson
Attorneys

METHOD AND APPARATUS FOR CONVERTING A TRICYCLE TO A BICYCLE

The apparatus of the instant invention comprises an attachment which may be manufactured in at least two forms and utilized to convert a tricycle into a bicycle for use by a child in converting from a standard tricycle to a bicycle, the converted tricycle of the instant invention being designed for use by a child during the transition period between his riding a tricycle and his riding a conventional bicycle.

A tricycle converted into a bicycle in accordance with the present invention not only provides a two-wheeled velocipede for use by a small child in learning to ride a conventional bicycle, but a bicycle-type velocipede with which he is basically familiar and accustomed to. Also, a tricycle converted in accordance with the present invention produces an extremely low bicycle which may be readily handled by a small child with assurance that he will not fall from the greater height in which he would be riding if he was riding even a small bicycle of conventional design.

In addition to the above aforementioned advantages, a parent may convert his child's tricycle into a bicycle at a nominal cost and delay the greater expenditure involved in the purchase of a conventional bicycle until such time as his child has mastered riding the converted tricycle, at which time the child may easily make the transition to a conventional bicycle. Further, in one form of the invention to be illustrated and described hereinafter more fully, a tricycle may be converted into a bicycle in accordance with the present invention and thereafter back into a tricycle for use by younger children after an older child has mastered riding the converted tricycle and has been given a conventional bicycle.

The main object of this invention is to provide a method and apparatus for converting a tricycle into a two-wheeled velocipede more readily suited for use by a child in making the transition from a tricycle to a bicycle.

Another object of this invention, in accordance with the immediately preceding object, is to provide a conversion apparatus for converting a tricycle into a bicycle which may be manufactured and marketed at a low cost.

A still further object of this invention is to provide a conversion apparatus in accordance with the preceding objects which may also be utilized in converting a tricycle once converted into a bicycle back into a tricycle for use by younger children or further use by a child deemed not ready for the transition to a bicycle.

A final object of this invention to be specifically enumerated herein is to provide a method and apparatus for converting a tricycle to a bicycle and which will conform to conventional forms of manufacture, be of simple construction and easy to use so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4, 5:
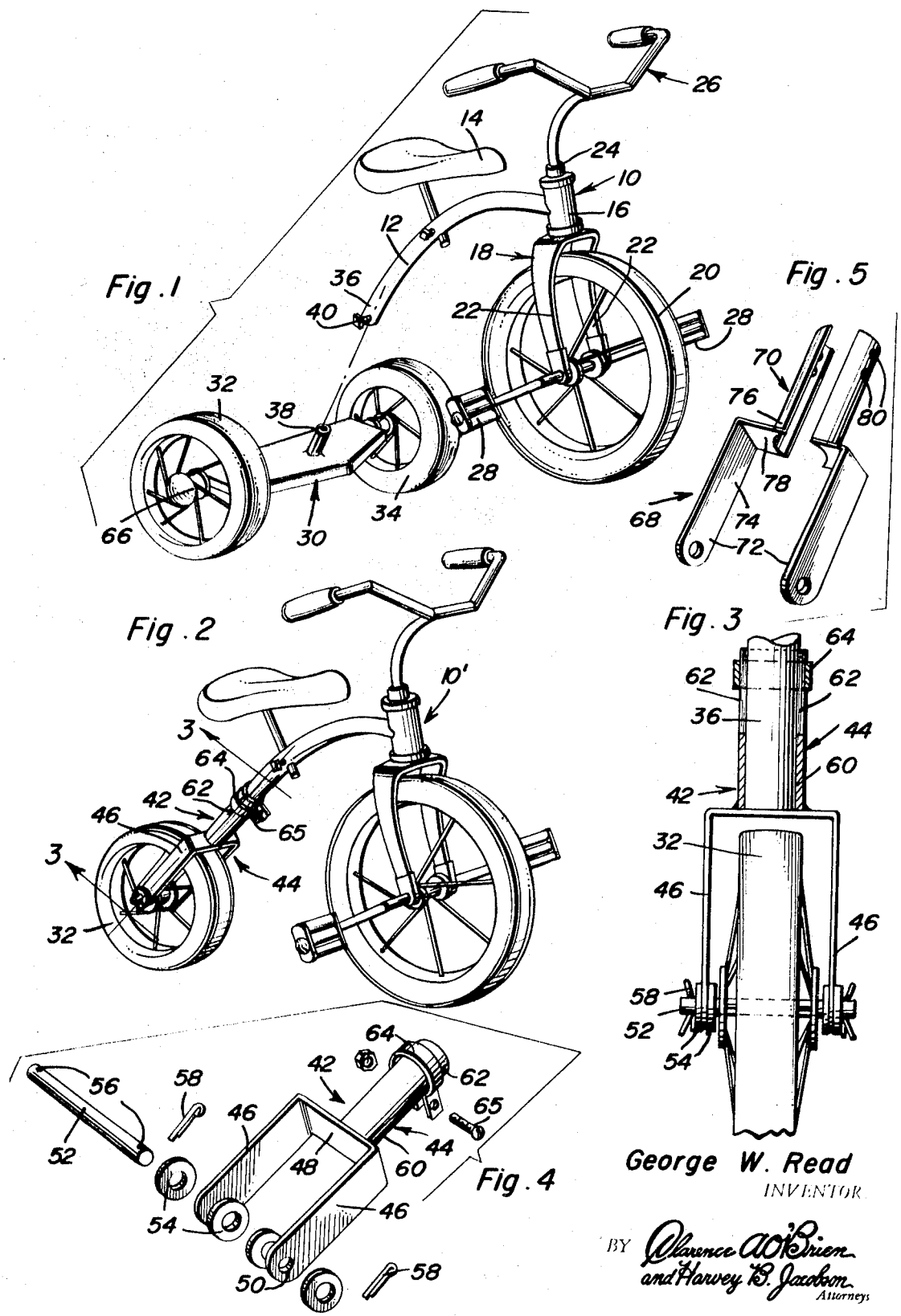
FIG. 1 is a perspective view of a somewhat modified conventional form of tricycle having a readily removable rear axle assembly and with the rear axle assembly being illustrated in exploded position.
FIG. 2 is a perspective view of the tricycle of FIG. 1 after having been converted into a bicycle in accordance with the present invention.
FIG. 3 is an enlarged fragmentary sectional view taken substantially upon the plane indicated by the section line 3—3 of FIG. 2.
FIG. 4 is an exploded perspective view of one form of conversion apparatus to be utilized in converting a tricycle to a bicycle.
FIG. 5 is an exploded perspective view of a second form of conversion apparatus with the attaching hardware and axle shaft and related articles removed.

Referring now more specifically to the drawings, the numeral 10 generally designates a conventional but somewhat modified form of tricycle which includes a forwardly and downwardly opening arcuate main frame 12 from whose mid-portion an adjustable seat 14 is supported. In addition, a mounting sleeve 16 is supported from the forward upper end of the main frame 12 and a conventional front fork assembly referred to in general by the reference numeral 18 is journaled from the sleeve 16 and has the usual pedal crank mounted front wheel 20 journaled between the lower ends of its arms 22. The front fork assembly 18 includes an upstanding shank 24 which is journaled through the sleeve 16 and to whose upper end a handlebar assembly referred to in general by the reference numeral 26 is secured. A pair of pedal assemblies 28 are journaled from opposite ends of the pedal crank assembly.

The tricycle 10 includes a rear axle assembly referred to in general by the reference numeral 30 and which includes removable opposite end wheels 32 and 34 journaled from the axle assembly 30. Normally, the central portion of the rear axle assembly 30 is brazed, welded or otherwise secured to the lower end 36 of the main frame 12. However, the tricycle 10 has been designed so as to be more readily converted in accordance with the present invention and the rear axle assembly 30 includes a forwardly and upwardly inclined mounting shank 38 which is telescopingly receivable in the lower end of the main frame 12 and which may be secured within the lower end 36 by means of a setscrew 40.

With attention now invited more specifically to FIG. 4 of the drawings there may be seen a first form of conversion kit referred to in general by the reference numeral 42 and which includes a fork assembly referred to in general by the reference numeral 44. The assembly 44 includes a pair of generally parallel arms 46 between one corresponding pair of ends of which an integral bight portion 48 extends. The other pair of ends of the arms 46 are apertured as at 50 and an axle pin 52 is provided together with four washers 54. The axle pin 52 includes opposite end diametric bores 56 and may have the washers 54 disposed thereon and be secured through the apertures 50 by means of cotter pins 58.

The fork assembly 44 further includes a mounting sleeve 60 which is secured to and projects outwardly from the side of the bight portion 48 remote from the apertures 50. The end of the mounting sleeve 60 remote from the bight portion 48 is longitudinally split as at 62 and has a clamp 64 operatively associated therewith.

In converting the tricycle 10 to a bicycle such as that referred to in general by the reference numeral 10' in FIG. 2 of the drawings, the rear axle assembly 30 is first removed by removing the setscrew 40 and thereafter withdrawing the mounting shank 38 from the lower end 36 of the main frame 12. Thereafter, the mounting sleeve 60 is telescoped over the lower end 36 of the main frame 12 and clamped in position thereon by means of the clamp 64 and its fastener 65. Thereafter, the wheel 32 is removed and positioned between the arms 46 before insertion of the axle pin 52 through the apertures 50 and the hub 66 of the wheel 32.

From FIG. 2 of the drawings it will be seen that the tricycle, after being converted into the bicycle 10', provides an extremely low two-wheeled velocipede which may be more conveniently and efficiently utilized by a small child especially when that small child is already familiar with all portions of the bicycle 10' except for the conversion kit portions thereof.

With reference now more specifically to FIG. 5 of the drawings there may be seen a modified form of conversion kit referred to in general by the reference numeral 68 and which defines a fork assembly referred to in general by the reference numeral 70. The fork assembly 70 includes a pair of identical sections 72 each defining an arm 74 corresponding to one of the arms 46 and a half sleeve section 76 as well as a half bight portion section 78. Of course, the conversion kit 68 is also to be provided with an axle pin such as pin 52, washers such as washers 54 and cotter pins such as cotter pins 58. However, the half sleeve sections 76 of the conversion kit 68 are provided with registrable apertures 80 through which through bolts (not shown) may be secured for clampingly securing the half sleeves 76 to opposite sides of the lower end portion 36 of the frame 12 after appropriate diametric bores have been formed through the frame 12 which are registrable with the apertures or bores 80.

It is to be noted that the tricycle 10 need not be provided with a removable rear axle assembly such as assembly 30. The removable assembly 30 is merely provided in order to enable the tricycle 10 to be converted back into a tricycle after once having been converted into the bicycle 10'. However, a person purchasing the conversion kit 42 for use with a conventional tricycle may merely cut the rear axle assembly 30 from the extreme lower end 36 of the main frame 12 and apply the fork assembly 44 to the cut end of the main frame 12 and thereafter mount the wheel 32 between the arms 46.

Further, the conversion kits 42 and 68 are not limited to their use on a conventional tricycle. It is anticipated that somewhat modified forms of tricycles may be developed in the future and that conversion kits such as kits 42 and 68 may be used in converting such modified tricycles into two-wheeled vehicles. Also, the mounting sleeve 60 could be telescoped within the lower end 36 if the latter was provided with a longitudinal slit. Finally, it should also be noted that the fork assembly 44 could be provided with suitable mounting structure whereby it may be secured to the tricycle 10 beneath the rear axle assembly 30 without removing the latter. Of course, if such mounting of the assembly 30 is to be used, the assembly 30 will be provided with its own wheel such as wheel 32 and in this manner, if the extra wheel is smaller in diameter than the wheels 32 and 34, the latter will function as training wheels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claim as new is as follows:

1. In combination, a tricycle of the type including an upstanding front to rear extending main frame of longitudinal extent provided with a front fork supported from the front end portion of the main frame for oscillation about an upstanding axis, a pedal crank assembly mounted front wheel journaled from said front fork, and a rear downwardly projecting portion of said frame from the lower end of which a terminal end portion supporting a horizontal transverse axle assembly has been cut, a replacement rear axle assembly for use in lieu of said transverse axle assembly, said replacement axle assembly including a rear fork having a pair of spaced generally parallel side-by-side upstanding arms interconnected at their upper ends by means of a generally horizontal integral bight portion extending and secured therebetween, a single wheel having a central hub portion, means journaling said hub portion between the lower ends of said arms, an upstanding mounting sleeve having its lower end secured to said bight portion centrally intermediate said arms and with said mounting sleeve projecting upwardly from said bight portion, the upper end of said mounting sleeve being longitudinally split and telescoped over said lower end portion of said frame, and adjustable clamp means engaged about the split upper end of said mounting sleeve tightly and rigidly clamping said rear fork to said frame with said single wheel disposed generally in the plane of said main frame.

* * * * *